(12) United States Patent
van Oldenborgh et al.

(10) Patent No.: US 7,738,513 B2
(45) Date of Patent: *Jun. 15, 2010

(54) METHOD FOR INVERSE MULTIPLEXING

(75) Inventors: Marc van Oldenborgh, Amsterdam (NL); Martijn Gnirrep, Amsterdam (NL)

(73) Assignee: Nonend Inventions N.V., Bilthoven (NL)

( * ) Notice: Subject to any disclaimer, the term of this patent is extended or adjusted under 35 U.S.C. 154(b) by 1923 days.

This patent is subject to a terminal disclaimer.

(21) Appl. No.: 10/730,837

(22) Filed: Dec. 8, 2003

(65) Prior Publication Data

US 2004/0114639 A1 Jun. 17, 2004

Related U.S. Application Data

(62) Division of application No. 10/119,103, filed on Apr. 8, 2002, now Pat. No. 6,687,263.

(30) Foreign Application Priority Data

Apr. 18, 2001 (NL) .................................... 1017870

(51) Int. Cl.
*H04J 3/02* (2006.01)
(52) U.S. Cl. ...................... 370/537; 370/236; 370/451; 370/532; 370/533; 370/534; 370/535; 370/536; 370/538; 370/539; 370/540; 370/541; 370/542
(58) Field of Classification Search ................ 370/236, 370/451, 532–542
See application file for complete search history.

(56) References Cited

U.S. PATENT DOCUMENTS

| | | | |
|---|---|---|---|
| 5,293,378 A | * | 3/1994 | Shimizu ..................... 370/474 |
| 5,570,356 A | * | 10/1996 | Finney et al. ............... 370/476 |
| 5,668,923 A | | 9/1997 | Siwiak et al. |
| 5,799,018 A | * | 8/1998 | Kanekiyo et al. ........... 370/451 |
| 5,819,117 A | | 10/1998 | Hansen |
| 5,867,500 A | * | 2/1999 | Dolman et al. ........... 370/395.4 |
| 5,948,099 A | | 9/1999 | Crawford et al. |
| 6,078,565 A | * | 6/2000 | Ben-Michael et al. ....... 370/236 |
| 6,160,808 A | | 12/2000 | Maurya |

(Continued)

FOREIGN PATENT DOCUMENTS

EP 0 614 323 A1 9/1994

(Continued)

OTHER PUBLICATIONS

Duncanson, Jay. "Inverse Multiplexing". IEEE Communications Magazine. Apr. 1994. pp. 34-41.*

(Continued)

*Primary Examiner*—William Trost, IV
*Assistant Examiner*—Toan D Nguyen
(74) *Attorney, Agent, or Firm*—Finnegan, Henderson, Farabow, Garrett & Dunner, LLP

(57) ABSTRACT

A method for multiplexing digital data, wherein a packet of digital data is simultaneously sent from front to rear and from rear to front. Additionally, a method for multiplexing digital data, wherein a packet of digital data is simultaneously sent from the beginning of the packet towards the end and from the end towards the beginning. Additionally, a method for multiplexing digital data, wherein simultaneously a packet of digital data is sent and the same packet is sent backwards.

18 Claims, 5 Drawing Sheets

U.S. PATENT DOCUMENTS

| | | |
|---|---|---|
| 6,198,749 B1 | 3/2001 | Hui et al. |
| 6,205,142 B1 * | 3/2001 | Vallee ........................ 370/394 |
| 6,275,503 B1 * | 8/2001 | Driscoll ..................... 370/471 |
| 6,339,756 B1 | 1/2002 | Hinderks |
| 6,360,054 B1 * | 3/2002 | Nakano et al. ................ 386/68 |
| 6,415,398 B1 | 7/2002 | Kikuchi et al. |
| 6,775,305 B1 * | 8/2004 | Delvaux ..................... 370/535 |
| 6,876,669 B2 * | 4/2005 | Shalom ...................... 370/468 |
| 2002/0136188 A1 * | 9/2002 | Kim ........................... 370/342 |
| 2002/0150065 A1 * | 10/2002 | Ponnekanti ................. 370/334 |

FOREIGN PATENT DOCUMENTS

| | | |
|---|---|---|
| EP | 0 614 323 B1 | 9/1994 |
| EP | 0 910 195 A2 | 4/1999 |
| EP | 1 091 530 A2 | 10/1999 |
| EP | 1 024 632 A2 * | 8/2000 |
| EP | 1 039 693 A2 | 9/2000 |
| EP | 1 047 239 A2 | 10/2000 |
| JP | 3-42940 | 2/1991 |
| JP | 09-64913 | 3/1997 |
| JP | 11-225161 | 8/1999 |
| JP | 2000-307650 | 11/2000 |
| WO | WO 96/27248 | 9/1996 |
| WO | WO 00/16569 | 3/2000 |
| WO | WO 02/084933 A2 | 10/2002 |
| WO | WO 03/005661 A1 | 1/2003 |

OTHER PUBLICATIONS

Stallings, William. "Data and Computer Communications". Prentice Hall. 1997, pp. 158-164.*

IEEE International Conference on Communications, "Disperity Routing," by N.F. Maxernchuk, Jun. 16-18, 1975, pp. 41-10-41-13, New York, pp. 41-10.

IEEE Transactions on Communications, "Diversity Coding for Transparent Self-Healing and Fault-Tolerant Communication Networks," by Ender Ayanoglu, vol. 41, No. 11, Nov. 1993, pp. 1677-1686.

IEEE International Workshop on Network and Operating Systems Support for Digital Audio and Video, "Random RAIDs with Selective Exploitation of Redundancy for High Performance Video Servers," by Yitzhak Birk, pp. 13-23.

IEEE INFOCOM 2000, Nineteenth Annual Joint Conference on the IEEE Computer and Communications Societies, "Parallel-access for mirror sites in the Internet," by Rodriguez, P. et al., vol. 2, pp. 864-873, Tel Aviv, Israel, Mar. 2000.

* cited by examiner

METHOD FOR INVERSE MULTIPLEXING

The present patent application is a Divisional of application Ser. No. 10/119,103, filed Apr. 8, 2002 now U.S. Pat. No. 6,687,263.

FIELD OF THE INVENTION

The invention relates to a method for multiplexing digital data, and software for that purpose.

BACKGROUND

In practice very many methods to send data are known, particularly through a network. An example are digital data that are sent through the internet, but also digital telephone signals, such as for instance in case of cordless GSM telephones.

In practice there are also various methods known for multiplexing digital data.

The data are sent via a medium in the form of data packets. This can take place via a physical cabling in for instance copper or glass fibre, or via infrared or radio waves.

Because the capacity, often coupled to bandwidth, of the media over which the data are being sent mostly is too small, the data are often compressed. However, this has often appeared not to be sufficient.

Additionally many of these methods are aimed at optimising the data transfer between two computers.

SUMMARY OF THE INVENTION

It is among others an object of the present invention to at least partially solve these problems. To that end the invention provides a method for multiplexing digital data, wherein a packet of digital data is simultaneously sent from front to rear and from rear to front. Additionally the invention provides a method for multiplexing digital data, wherein a packet of digital data is simultaneously sent from the beginning of the packet towards the end and from the end towards the beginning. Additionally the invention provides a method for multiplexing digital data, wherein simultaneously a packet of digital data is sent and the same packet is sent backwards.

By splitting the data stream in two simultaneous streams, wherein the one stream starts sending the data from the front and works its way to the rear, and the other stream works its way from the rear to the front, the possibility is given to very quickly send data between and to for instance computers.

Another advantage of the method is that no other control signals or techniques are necessary to reconstruct the entire signal or data packet or to adjust both streams to each other: the signal or data packet is complete when the two streams meet each other, or when the data buffer is full. Delays in one of either lines do not lead to loss of signal.

In many cases the data connection is a-symmetrical: the transmission capacity is smaller than the receiving capacity. In the method according to the invention it is possible, despite the smaller transmission capacity, to nonetheless use the full receiving capacity. This may for instance be of importance in so-called streaming broadcasts through the internet, wherein through the internet digital radio broadcasts and in future even television or video can take place. Both data streams can also enter via various lines.

For instance the one data stream can for example enter via a telephone line and the second data stream via a cable, the electricity grit or cordless via GSM. It is also possible to let the data streams enter via one cable by means of physical multiplexing. The invention therefore actually offers a specific form of digital multiplexing.

Preferably the present invention relates to a method as described, wherein a first device sends the data from front to rear to a third device, and a second device sends the same data from rear to front to the third device. As a result the third device is able to have all data available very quickly.

Preferably the third device places the data in a data buffer the size of the packet, and sends a signal to the first and second device when either the buffer is full, or stops sending confirmations until the buffer is full. In this way the coordination between both streams is very simple.

It is preferred that in a method according to the invention a first device sends data from front to rear to a second device, and simultaneously backwards to a third device. As a result the possibility is offered to very quickly provide two devices with all data, with an optimally used bandwidth. In this method it is preferred that the second device and third device immediately at receipt forward the data they received from the first device to each other. As a result both devices can optimally use their bandwidth and transmission capacity.

In said method it is preferred that the second and third device have been provided with a data buffer the size of the packet, wherein the received data are placed in the data buffer and the first and second device send a signal to the first device when the respective data buffer is full.

Additionally the invention relates to a method for sending a data packet to a first device in an organic (also called 'ad-hoc') data network of devices, wherein the devices have been provided with a data processing unit, a data buffer and software having receiving routines for receiving data packets from at least two transmitting devices in the data network, wherein at least two other devices in the network simultaneously send complementary data packets to the first device which added together form the data packet.

Preferably said software has further been provided with transmission routines for transmitting data packets, received from the transmitting device or devices in the data network to at least one receiving device that is connected to the data network, independent of the transmitting device or devices.

Additionally the invention relates to a method for receiving digital data, wherein a device provided with data storage means creates a data buffer in the data storage means the size of a packet of digital data, and simultaneously receives a first stream of digital data and receives a second stream of digital data, wherein the device fills the data buffer from front to rear with the first stream of digital data and fills the data buffer from rear to front with the second stream of digital data.

Preferably the device informs the source or sources of the streams of digital data when a data buffer is full. As a result the coordination is simple.

Additionally the invention relates to a method for sending digital data, wherein a device provided with data storage means creates a data buffer in the data storage means, stores digital data in the data buffer, and from the front of the data buffer and the rear of the data buffer sends the digital data in two streams.

Preferably the device stops sending after receipt of a signal. As a result the coordination is again simple.

Additionally the invention relates to software provided with routines for carrying out the method according to one of methods mentioned above.

From the above description, in combination with the figures and their description, it will immediately be clear to an expert which routines are necessary to that end, and how said routines have to function with respect to each other. Such software may of course be immediately implemented in hardware, for instance in a PROM, EPROM or the like.

Additionally, the invention relates to an software for sending a packet of digital data, comprising a first transmission routine for sending a first stream of digital data starting from the front of the packet of digital data and a second transmission routine for sending a second stream of digital data starting from the end of the packet of digital data Furthermore, the invention relates to software for receiving a packet of digital data, comprising a first receiving routine for receiving a first stream of digital data and a second receiving routine for simultaneously receiving a second stream of digital data, and a first storing routine for storing the first stream of digital data in a memory starting at the front of the memory and filling the memory towards the end, and a second storing routine for storing the second stream of digital data starting at the end of the memory and filling the memory towards the front, and a stop routine for ending the receiving of digital data when the memory is full.

Furthermore, the invention relates to an apparatus for sending a packet of digital data, comprising memory means for storing the packet of digital data, first sending means for sending a first stream of digital data, starting at the front of the memory means and second sending means for sending a second stream of digital data, starting at the end of the memory means.

Furthermore, the invention relates to an apparatus for receiving a packet of digital data, comprising memory means for storing the packet of digital data, first receiving means for receiving a first stream of digital data, and storing it in said memory means, starting from the front of the memory means, and second receiving means for receiving a second stream of digital data, and storing it in said memory means, starting from the back of the memory means.

Additionally the invention relates to a carrier provided with software as described, and to a device provided with software as described.

In a specific embodiment of the invention, packets of digital data are sent in the form of bitstreams. In another embodiment, the packets are divided into smaller sub-packets, for instance numbered 1 . . . n. In this case, the sub-packets are sent 1, 2, etc in the first stream, i.e. sequentially, starting with the first sub-packet, and the sub-packets are sent n, n−1, . . . etc in the second stream, i.e. sequentially, starting with the last sub-packet. In a further embodiment, these two streams are sent almost simultaneous. The two streams can be sent over the same carrier, for instance using conventional multiplexing techniques, or they can be sent over entirely different carriers, for instance cable modem and telephone line. The digital data can also be of another form instead of the now-used binary data.

BRIEF DESCRIPTION OF THE DRAWINGS

The invention is further elucidated on the basis of the figures that are exemplary embodiments of the invention. However, the invention is not limited to said exemplary embodiments. Shown in the figures is.

DESCRIPTION OF PREFERRED EMBODIMENTS

Figure 1:
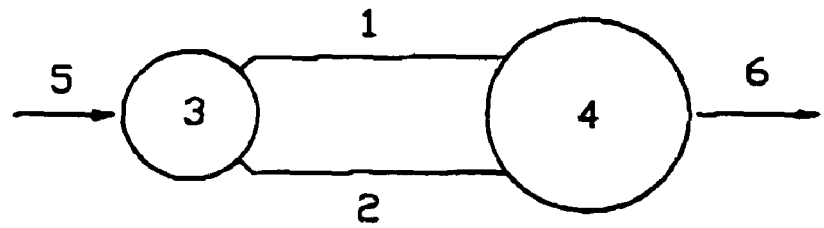
FIG. 1 the splitting of one signal into two signals and the adding together at the receiver.

FIG. 1 shows a situation in which a signal 5 in a conventional manner enters a receiver 3. The receiver 3 splits the signal, or each data packet from which the signal has been built up, into two streams 1 and 2 to forward it to receiver 4. Stream 1 is the signal sent from the front, that means the first bit of the data packet or the signal is sent first, then the second, etc. Stream 2 is the signal 5 or a data packet thereof, but then backwards, that means first the last bit is sent then the last but one, etc.

Therefore, as both streams make up the entire stream, the two streams may be considered as complementary streams.

Receiver 4 simultaneously fills its data buffer from the front with signal 1 and from the rear with signal 2. This can take place by means of a computer program, but can also be implemented hardware-wise. When the buffer is full, that means the complete signal or data packet has been received, receiver 4 sends a signal to receiver/transmitter 3 that the buffer is full, that means that the signal has been received. It is of course also possible that the receiver 4 keeps sending a signal to receiver/transmitter 3 until the buffer is full, or just closes down the connection when the buffer is full, or sets the port at high or low.

Figure 2:
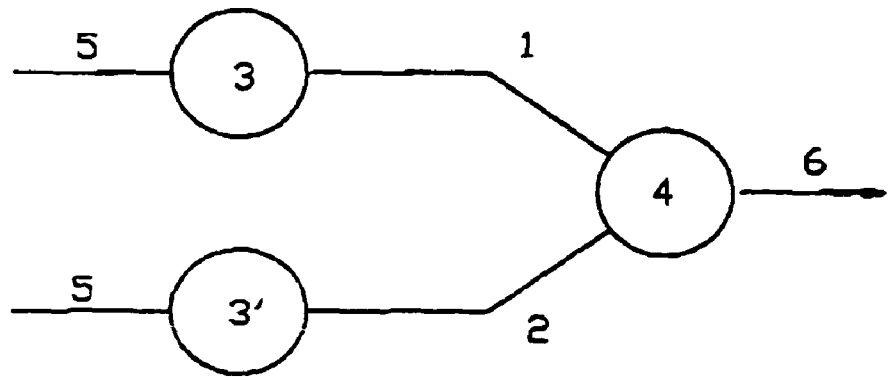
FIG. 2 the receipt of a split signal by a receiver from two physically separated sources, FIG. 3 the provision of two receivers with one signal, FIG. 4 the provision of three receivers with one signal, FIG. 5 an alternative for the situation of FIG. 4, FIG. 6 an example of the relation between bandwidth and the quantity of signal, FIG. 7 a second example of the relation between bandwidth and quantity of signal, FIGS. 8A-8C a receiving device, FIGS. 9A-9C a sending device, FIGS. 10A-10D a device which receives and almost simultaneously sends, and FIG. 11 the process of sending and receiving

The principle depicted in FIG. 1, can also be used in FIG. 2 with 2 sources 3, 3' that transmit to a receiver 4. In that case the sources 3, 3' receive the entire (or already split) signal or data packet 5, and each send a partial signal 1 or 2, respectively, to receiver 4. This offers advantages when the transmission capacity of sources 3 and 3' is lower than the receiving capacity of receiver 4. The receiver 4 may even forward the reconstructed signal or data packet 6 in its entirety again.

Figure 3:
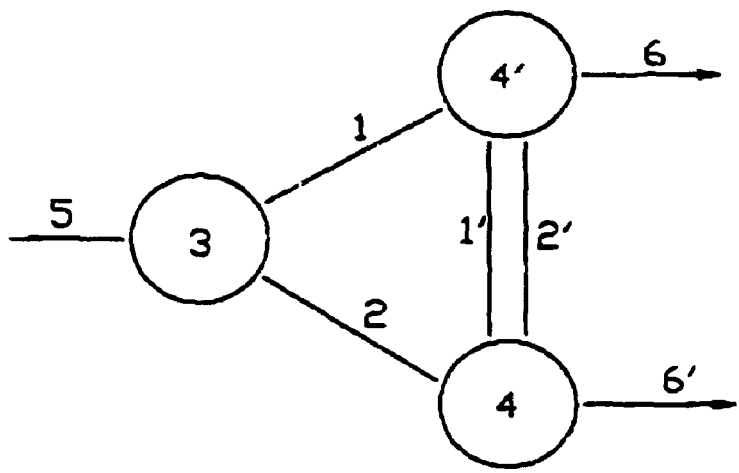

FIG. 3 shows an example of the method according to the present invention, wherein one source 3 splits a signal or data packet 5 into two complementary streams 1 and 2. The one stream is sent to receiver 4, the other stream to receiver 4'. Both receivers 4 and 4' send what is received to each other, so that both obtain a complete signal or data packet again. This offers advantages when the transmission capacity/bandwidth of 3 is limited, but/and the capacity between 4 and 4' is sufficient for exchange of data.

Figure 4:
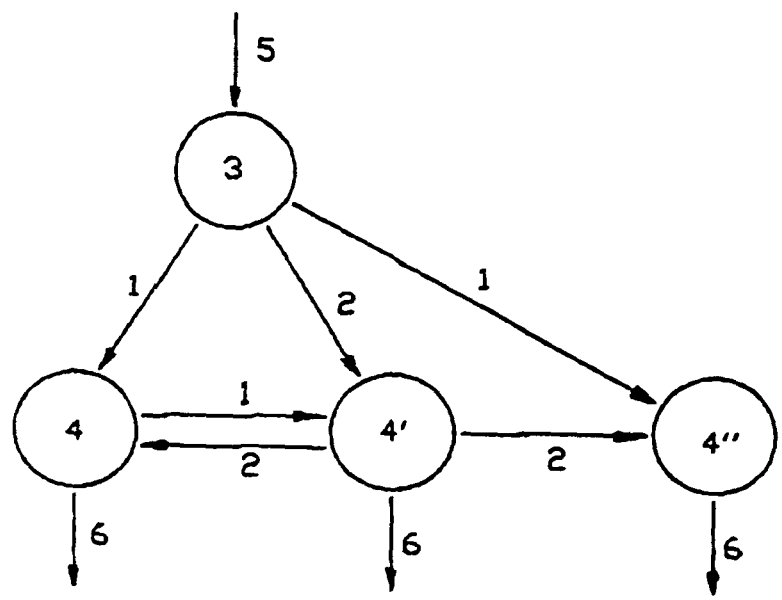

FIG. 4 shows an example wherein a source 3 splits a signal or data packet 5 into two streams, wherein stream 1 is sent to receivers 4, 4", and stream 2 to receiver 4'. Receiver 4' forwards its part of the signal or data packet to 4 and 4", whereas 4 forwards its part to 4'. In the optimal case all receivers 4, 4' and 4" will receive the entire signal or data packet in less time than usually needed in conventional point-to-point connections, or while using less bandwidth.

Figure 5:
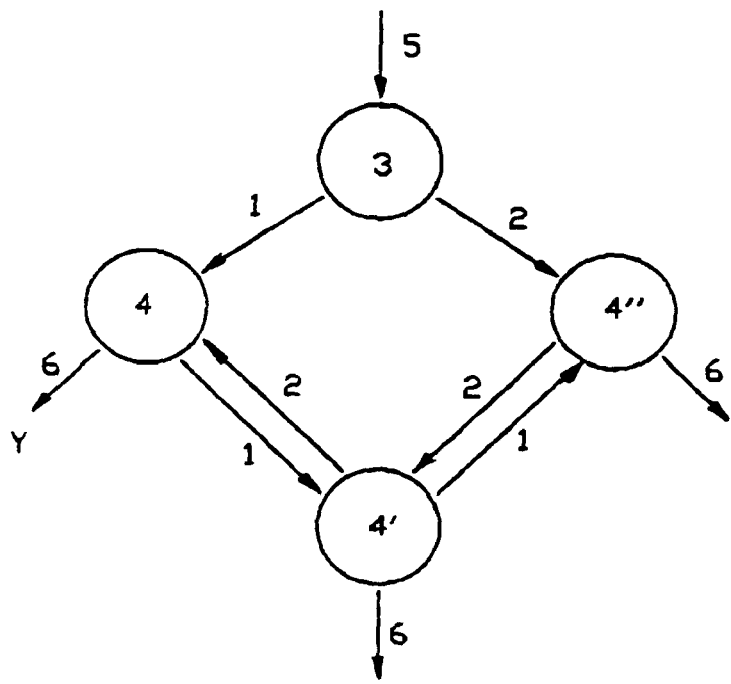

FIG. 5 shows an example of the use of the method according to the invention, wherein a source 3 having limited data transfer capacity splits a signal or data packet 5 into two streams 1 and 2. Stream 1 is sent to receiver 4, stream 2 to receiver 4", and receivers 4 and 4" forward their part to receiver 4'. As a result three receivers have received the entire signal or data packet within less time usually needed to send the packet in its entirety to all three receivers, and the bandwidth used is smaller.

Figure 6:
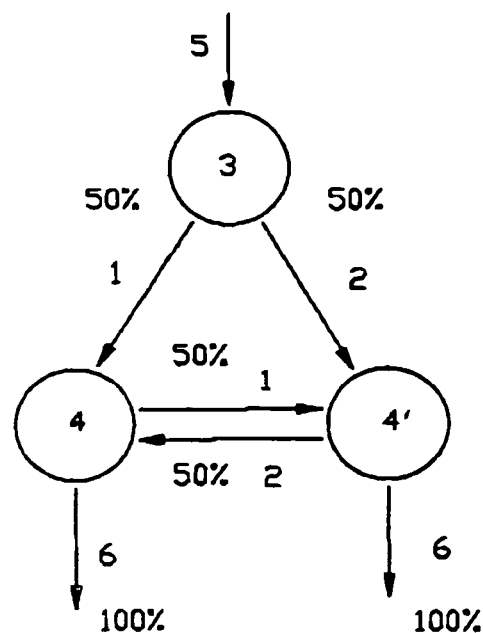
Figure 7:
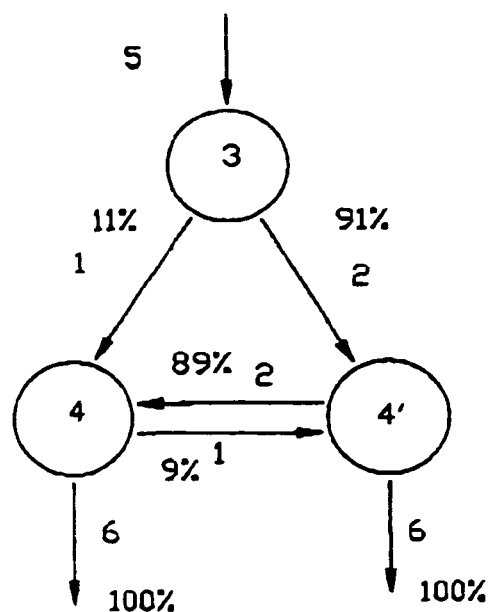

FIGS. 6 and 7 show calculation examples wherein in case of FIG. 6 the available bandwidth from transmitter 3 to receivers 4 and 4' is almost the same. In that case receivers 4 and 4' will have received the data in 50% of the usually necessary time, and this is also the load for transmitter 3, seen in bandwidth, only 2 times 50% in total instead of 2 times 100%. Thus, digital data is sent without any overhead (transmitter 3 may stop sending when all data is sent) and very fast.

In the calculation example of FIG. 7 the connection is a-synchronous. Receiver 4' receives 91% of the total data packet, and receiver 4 receives 11% of the total data packet. The nett result is that transmitter 3 in the end only needs to send the total data packet once. Additionally there will be a small gain of speed in this unfavourable case. In this case, the sending capacity from transmitter 3 to receiver 4, as well as the sending capacity from receiver 4 to receiver 4'. Due to very low-transmission capacity from receiver 4 to receiver 4' (or delays) only 9% instead of 11% could be transmitted from receiver 4 to receiver 4'.

Figure 8A:
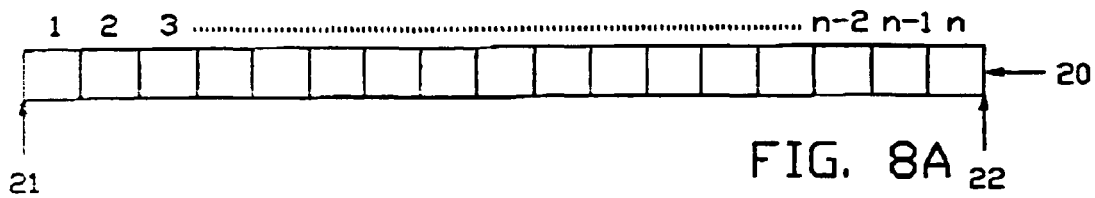
Figure 8B:
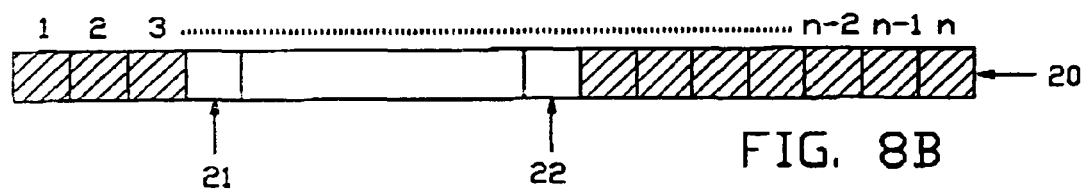
Figure 8C:
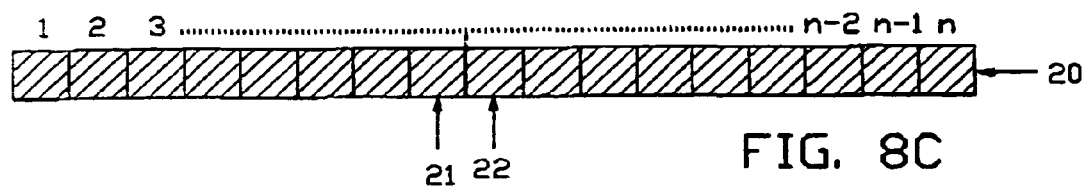

In FIGS. 8A-8C, the process of receiving a digital data packet split into two streams according to the present invention is shown. In FIG. 8A, two streams 21 and 22 are received and put into data buffer 20. The first part of the received data from stream 21 is put in place 1, the first part of received data from stream 22 is put in place n. In FIG. 8B, an intermediate step is shown. In this case, via stream 21 the 4th data part is received and is put into buffer at location 4, while via stream 22 also another (n–i th) data part is received. Despite the fact that the two streams are not equally fast, no overhead is needed. In FIG. 8C, the two streams meet, the buffer is full. This will trigger the device to stop receiving, or send a signal that the digital data packet is complete.

Figure 9A:
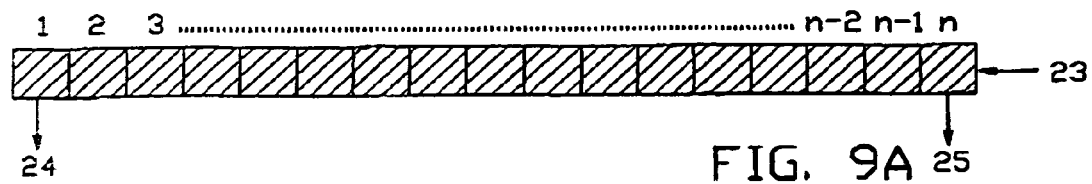
Figure 9B:
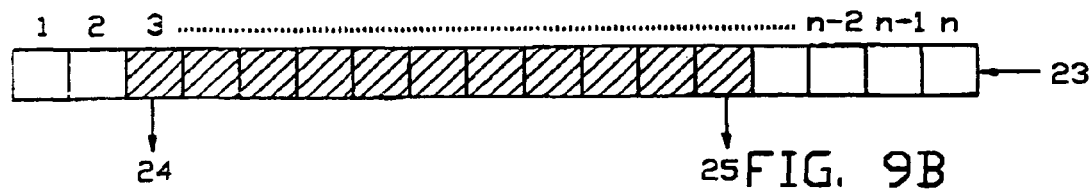
Figure 9C:
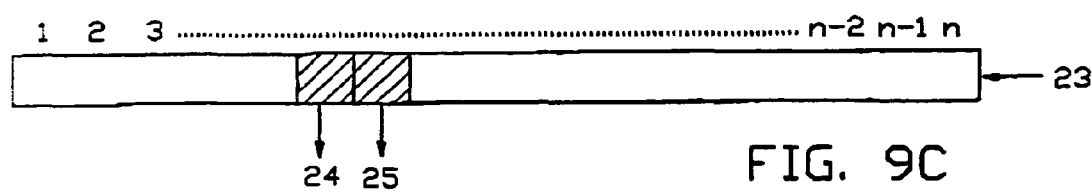

In FIGS. 9A-9C, the sending side is shown. In FIG. 9A, data buffer 23 is full of data. The device starts taking data from data buffer, starting at the front of the data buffer 23, and starts sending the data. At the same time, the device starts taking data from the back of data buffer 23, position n, and sends this data. In FIG. 9B, taken some time later, it can be seen that the device takes data part 3 from data buffer 23 and sends it. At the same time, from the rear end of the data buffer the fifth data part is taken and send. The device sequentially takes the next, etc, so the next data parts would be number 4 and the 6th from the back. In FIG. 9C, the last data parts are taken. Again, it can be seen that sending is swift, and without complex overhead.

FIGS. 10A-10D show the situation where there is a device which both sends and receives according to the present invention. This time, data buffer 26 is empty. The device starts receiving data parts via streams 28 and 29, stream 28 is put at the first place, and stream 28 will subsequently fill data buffer 26 from the front to the back. The first data part received from stream 29 will be put into the last position, n, of the data buffer 26. Subsequently, stream 29 will fill data buffer 26 from the back to the front, until the buffer is full.

At the same time, the device starts sending data parts via streams 30 and 31. Stream 30 starts from the front of the data buffer and stream 31 starts from the back of the data buffer.

Figure 10A:
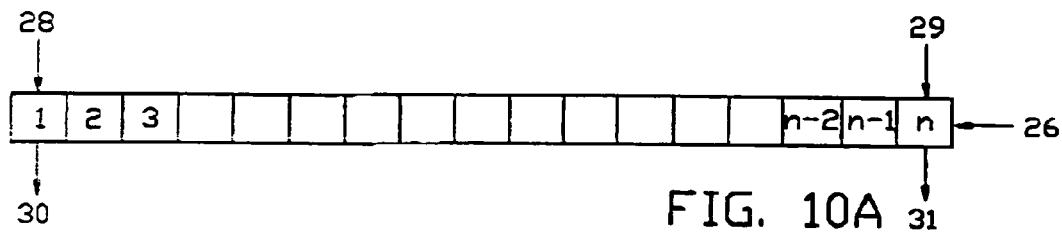
Figure 10B:
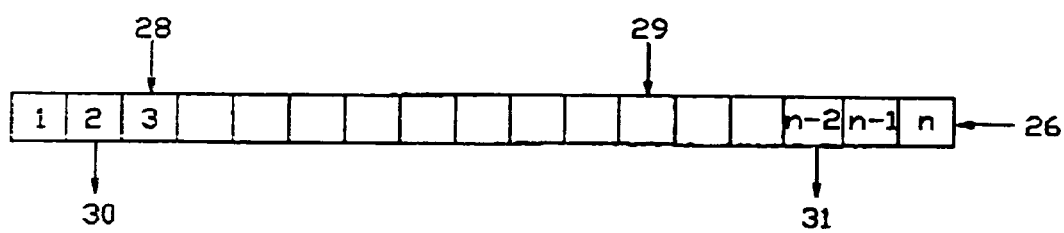
Figure 10C:
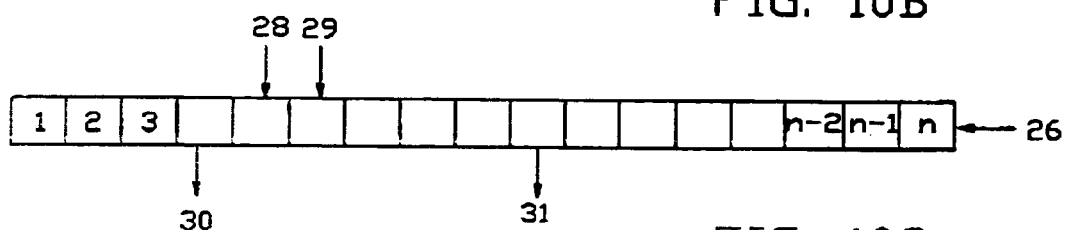
Figure 10D:
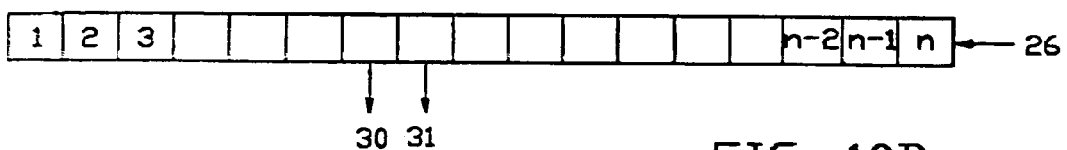

In FIG. 10C, it can be seen that in this case, the device receives data parts faster than it sends them. In FIG. 10C, all the data parts are received: the two streams 28 and 29 meet. The device keeps sending via streams 30 and 31. In FIG. 10D, the streams 30 and 31 meet, and the device can stop sending. This is all possible with a minimum on overhead.

Figure 11:
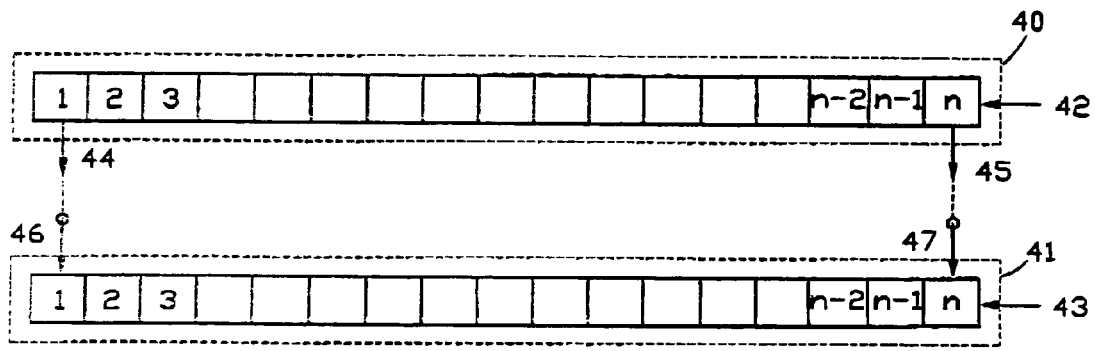

In FIG. 11. The process of sending and receiving are depicted in one figure. Apparatus 40 having data buffer 24 sends two streams of data 44 and 45. Apparatus 41 receives these two streams as streams 46 and 47, and puts the data in data buffer 43. Again, the sending apparatus 40 has two streams 44 and 45, one starting at the front and one at the back of data buffer 42. Receiving apparatus 41 receives two streams, and places one stream in the front, and one in the back of data buffer 43.

For that matter the method according to the invention can for instance be used in GSM or other cordless telephony. A conversation or a data stream can then be divided into packets which, in accordance with the method according to the invention, can be sent. Use can then also be made of the available bandwidth: each data stream can be sent over another band, so that optimal use is made of the available bandwidth.

It is to be understood that the above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

The invention claimed is:

1. A method for multiplexing digital data including a packet of digital data elements arranged 1 . . . n, the method comprising:
    sending a first stream of data elements stored in memory, starting with data element 1 of the packet and proceeding upward in sequential order;
    sending a second stream of data elements stored in the memory, starting with data element n of the packet and proceeding downward in sequential order; and
    terminating the sending of the first and second streams of data elements when the entire packet has been sent;
    wherein sending of the first stream and second stream is at least started approximately simultaneously.

2. The method according to claim 1, wherein a first device sends the first stream of data elements to a third device, and a second device sends the second stream of data elements to the third device.

3. The method according to claim 2, wherein the third device places the data elements in a data buffer having a size of the packet, and sends a signal to the first and second devices when the buffer is full.

4. The method according to claim 1, wherein a first device sends the first stream to a second device, and the second stream to a third device.

5. The method according to claim 4, wherein the second device and third device immediately at receipt forward the data they received from the first device to each other.

6. The method according to claim 5, wherein the second and third device have been provided with a data buffer having a size of the packet, wherein the received data are placed in the data buffer and the second and third devices send a signal to the first device when the respective data buffer is full.

7. A method for sending a data packet of digital data elements arranged 1 . . . n to a first device in an ad-hoc data network of devices provided with a data processing unit, a data buffer and receiving routines for receiving data elements from at least two transmitting devices in the data network, the method comprising:
    sending data elements of the data packet from at least a second device and a third device in the network to the first device, including:
    sending data elements from the second device starting from data element 1 of the data packet and proceeding upward in sequential order;
    sending data elements from the third device starting from data element n of the data packet and proceeding downward in sequential order; and adding together the data elements sent by the second device and the data elements sent by the third device to form said data packet at the first devices, wherein the data element 1 and the data element n are sent approximately simultaneously.

8. The method according to claim 7, wherein the devices are further provided with transmission routines for transmitting data packets, received from one or more transmitting devices in the data network to at least one receiving device that is connected to the data network, independent of the one or more transmitting devices.

9. A method for receiving a packet of data elements 1 ... n which are sent in at least a first stream of data elements sent starting with data element 1 of the packet and proceeding upward in sequential order, and a second stream of data elements sent starting with data element n of the packet and proceeding downward in sequential order, the method comprising:

providing a device with a data storage that defines a data buffer in the data storage for n data elements;

receiving the first stream of data elements and the second stream of data elements in the data buffer of the data storage;

filling the data buffer starting at the front of the data buffer and proceeding sequentially upward with the first stream of data elements; and filling the data buffer starting with rear of the data buffer and proceeding sequentially downward with the second stream of data elements, wherein the data element 1 and the data element n are received in the data buffer approximately simultaneously.

10. The method according to claim 9, wherein the device informs one or more sources of the streams of data elements when the data buffer is full.

11. A method for sending a packet of digital data elements 1 ... n, the method comprising:

creating a data buffer in a data storage device for n digital data elements, storing the digital data elements in sequential order in the data buffer;

sending the digital data elements in a first stream starting with data element 1 of the packet and proceeding upward in sequential order; and sending a second stream starting with data element n of the packet and proceeding downward in sequential order;

wherein sending of the first stream and second stream is at least started approximately simultaneously.

12. The method according to claim 11, further comprising:

terminating the sending of the first stream and the second stream upon receipt of a signal that a receiving buffer is full.

13. A computer-readable storage medium storing a computer program which, when executed by a computer, causes the computer to perform a method of sending a packet of digital data elements arranged 1, ..., n, the method comprising:

sending a first stream of digital data elements starting with data element 1 of the packet and proceeding upward in sequential order; and sending a second stream of digital data elements starting with data element n of the packet and proceeding downward in sequential order, wherein sending of the first stream and second stream is at least started approximately simultaneously.

14. A computer-readable storage medium storing a computer program which, when executed by a computer, causes the computer to perform a method of receiving a packet of digital data elements arranged 1, ..., n, the method comprising:

executing a first receiving routine for receiving a first stream of digital data and a second receiving routine for approximately simultaneously receiving a second stream of digital data;

executing a first storing routine for storing the first stream of digital data in a memory starting at the front of the memory and sequentially filling the memory towards the back, and a second storing routine for storing the second stream of digital data starting at the of the memory and filling the memory sequentially towards the front, and executing a stop routine for ending the receiving of digital data when the memory is full or the n digital data elements have been received, wherein the digital data from the front of the memory and the digital data from the back of the memory are stored approximately simultaneously.

15. An apparatus for sending a packet of digital data elements 1 ... n, comprising:

a memory for storing the packet of digital data, a first transmitter for sending a first stream of digital data elements, starting with data element 1 of the packet and proceeding upward in sequential order, and a second transmitter for sending a second stream of digital data elements, starting with data element n of the packet and proceeding downward in sequential order;

wherein the first transmitter and second transmitter are configured to at least start sending the first stream and second stream approximately simultaneously.

16. The apparatus of claim 15, wherein the first transmitter and the second transmitter are configured to terminate sending when a signal is received from a receiver.

17. An apparatus for receiving a packet of digital data elements, comprising:

a memory for storing the packet of digital data elements, a first receiver for receiving a first stream of digital data elements of the packet, and storing the first stream of digital data elements in said memory, starting from the front of the memory and proceeding toward the back of the memory, and a second receiver for receiving a second stream of digital data elements of the packet, and storing the second stream of digital data elements in said memory, starting from the back of the memory and proceeding toward the front of the memory;

wherein the digital data from the front of the memory and the digital data from the back of the memory are received approximately simultaneously.

18. The apparatus of claim 17, wherein the first receiver the second receiver, or both the first and second receivers are configured to send a signal to a transmitter when the memory is full.

* * * * *

UNITED STATES PATENT AND TRADEMARK OFFICE
CERTIFICATE OF CORRECTION

| | | |
|---|---|---|
| PATENT NO. | : 7,738,513 B2 | |
| APPLICATION NO. | : 10/730837 | |
| DATED | : June 15, 2010 | |
| INVENTOR(S) | : Marc van Oldenborgh et al. | |

It is certified that error appears in the above-identified patent and that said Letters Patent is hereby corrected as shown below:

In claim 14, col. 8, line 19, "stream of digital data starting at the of the memory and" should read
-- stream of digital data starting at the back of the memory and --

Signed and Sealed this
Twenty-eighth Day of June, 2011

David J. Kappos
*Director of the United States Patent and Trademark Office*